United States Patent
Poppen et al.

[11] Patent Number: 6,038,509
[45] Date of Patent: Mar. 14, 2000

[54] SYSTEM FOR RECALCULATING A PATH

[75] Inventors: Richard Frederick Poppen, San Jose; Rodney Jude Fernandez, Fremont, both of Calif.

[73] Assignee: Etak, Inc., Menlo Park, Calif.

[21] Appl. No.: 09/012,062

[22] Filed: Jan. 22, 1998

[51] Int. Cl.⁷ .............................. G01C 21/00; G06G 7/78
[52] U.S. Cl. ...................... 701/210; 701/26; 701/201; 701/209
[58] Field of Search ................................ 701/200, 23, 25, 701/26, 201, 208, 209, 210, 211, 221, 224; 340/990, 995, 988; 370/238, 255, 400

[56] References Cited

U.S. PATENT DOCUMENTS

| | | | |
|---|---|---|---|
| 5,303,159 | 4/1994 | Tamai et al. ............................ | 701/210 |
| 5,652,706 | 7/1997 | Morimoto et al. ...................... | 701/210 |
| 5,752,217 | 5/1998 | Ishizaki ................................... | 701/201 |
| 5,774,073 | 6/1998 | Maekawa et al. ....................... | 701/210 |
| 5,878,368 | 3/1999 | DeGraaf ................................. | 701/210 |
| 5,893,081 | 4/1999 | Poppen ................................... | 701/201 |

*Primary Examiner*—William A. Cuchlinski, Jr.
*Assistant Examiner*—Gertrude Arthur
*Attorney, Agent, or Firm*—Fliesler, Dubb, Meyer & Lovejoy LLP

[57] ABSTRACT

A typical pathfinding system provides a user with a set of directions for following a path from an origin to a destination in a network. If the user deviates from the path, the system for recalculating a path determines a new path which directs the user from the user's new location, which is off the original path, to the destination. To decrease the amount of time needed to determine the new path to the destination, the system adds links to the network. Each of the added links connect nodes from the original path directly to the destination. A new path is determined from the new location to the destination using the augmented network.

52 Claims, 6 Drawing Sheets

SYSTEM FOR RECALCULATING A PATH

BACKGROUND OF THE INVENTION

1. Field of the Invention

The present invention is directed to a system for recalculating a path in a network.

2. Description of the Related Art

Computers have revolutionized the idea of modeling systems for enhanced study and use of the systems. One example is the modeling of a system as a network. A network is defined in its most general sense as something that includes a number of paths that interconnect or branch out. Many systems that involve decisions can be modeled as a network. For example, a manufacturing process or a system of providing medical treatment can be modeled as a network of decision points and actions between decision points. A network can be represented in electronic form and stored on a processor readable storage medium so that software can be created for using the network model to study or use the system.

One example of a useful network that can be stored in electronic form is an electronic map, which includes geographically referenced electronic data quantifying a physical, social or economic system. The range of information included in electronic maps is unlimited; for example, electronic maps could include distances between elements, travel time, lot numbers, tax information, tourist information, processing time, waiting time, etc. Additionally, storing a map as an electronic file allows for unlimited software applications to manipulate that data.

One advantage of the electronic map is that it can store and determine costs associated with various portions of a map. A cost is a variable that can be minimized or maximized. Note that the costs are not necessarily monetary costs. Examples of costs include time, distance, tolls paid, ease of turning, quality of scenery, etc. A more detailed discussion of costs can be found in U.S. patent application Ser. No. 08/756,263, Using Multiple Levels Of Costs For A Pathfinding Computation, filed Nov. 25, 1996, Richard F. Poppen, and U.S. patent application Ser. No. 08/581,169, Cost Zones, filed Dec. 29, 1995, Richard F. Poppen, both of which are incorporated herein by reference. Typically costs are represented as integers; however, costs can be represented as real numbers.

Electronic maps, as well as other networks, can be used for pathfinding, which is a method for computing a route between an origin and a destination in the network. Some systems compute recommended routes and guide (or report to) the driver by highlighting the recommended route on a map display, or by giving turn-by-turn directions, or other suitable guidance means.

When a pathfinding system is computing a recommended route to a destination, it does so by finding the most desirable route according to certain specified criteria. These criteria may be specified by the driver, or may be set as defaults at the time of manufacture. Often, a system will be used to find a path that minimizes (or maximizes) some cost, for example, driving time. A more detailed discussion of pathfinding is found in U.S. patent application Ser. No. 08/802,733, "Caching For Pathfinding Computation," filed Feb. 20, 1997, Richard F. Poppen, et al. and U.S. patent application Ser. No. 08/756,258, "Method For Determining Exits and Entrances For A Region In A Network," Filed Nov. 25, 1996, Richard F. Poppen, both of which are incorporated herein by reference.

An electronic map that is used for pathfinding must carry information about the connectivity of a road network, that is, information about the ways in which pieces of road do or do not connect to each other, for example, where there are ordinary intersections, where there are overpasses, where turns are restricted, and so on. For an area of any significant extent, this is a very large amount of information. An electronic map can include tens or hundreds of megabytes of data. In order to hold such vast quantities of data economically and allow a user to replace maps with updated copie's easily, many current pathfinding system (which includes general purpose computers with pathfinding software, automotive navigation systems or other map application equipment) use CD-ROMs to store the electronic map data.

Although CD-ROMs hold a great deal of data, accessing that data can be relatively slow. For example, a typical CD-ROM drive used for automotive pathfinding may take on the order of $\frac{1}{3}$ of a second for each read access. If a pathfinding system had to wait $\frac{1}{3}$ of a second every time it needed data, the time needed to compute a path would not be acceptable to a user. A user of a navigational pathfinding system stored in a car typically demands very fast response times when requesting a path because a user currently driving in the car needs to know which way to turn. For these reasons, it is very important to minimize the number of disk accesses required to compute a path. It is noted that some systems may use peripheral devices other than CD-ROMs, for example, hard disks, floppy disks, solid state memory, etc. These other storage devices suffer similar access time limitations.

One attempt to minimize the number of disk accesses required to compute a path includes grouping map data into clusters, that is, grouping together on a CD-ROM (or other storage device) information about sets of road segments often used in the same path computation. For example, a number of consecutive segments of the same street, road segments that cross each other or road segments that lead to a highway may be stored in a single cluster. Note that these clusters need not be geographically based. Information about roads on two sides of a river in an area that is not close to a bridge would probably not be stored in the same cluster since the roads would not be used in relation to each other during path calculation even though they may be quite close to each other geographically. Information about highways over a wide area are good candidates to be stored together in one cluster because a path computation typically explores the connections of highways with other highways. There are many ways to cluster data to increase performance. One example of clustering data can be found in U.S. patent application Ser. No. 08/245,690, Method for Clustering Multi-Dimensional Data, filed May 18, 1994, Poppen et al., incorporated herein by reference. When clustering is used with a suitable cache methodology, the time for pathfinding is saved because information needed by the pathfinding computation is often already in the cache (or main memory) having been read as part of a cluster which includes data already used.

Caching is a well-known process of saving records recently read in order to reduce the number of disk/memory accesses. One of the most well known forms of caching includes using a small memory local to a processor called a cache memory. Certain data recently used is typically stored in the cache memory, with access to the cache memory being quicker than access to main memory. In this example, the cache memory caches data between main memory and a processor.

Another example of caching is to cache data between a storage device and main memory. An alternative to using a cache memory separate from main memory is to use a portion of main memory as the cache memory. When data is read from the storage device it is typically kept in the cache memory portion (hereinafter called "cache") of the main memory for a certain amount of time so that later access to that data will be quicker than accessing the storage device. The portion of the memory allocated as the cache will hold a number of records of data along with an indication of how recently each record has been used. When the program needs to read a given record, the program first looks in the cache for the record. If the record is in the cache, the program uses the information stored in the cache rather than reading the disk file again. If the record is not in the cache, and there is enough unused space in the cache to hold the record, the record is read into the cache and then used by the program. If the record is not in the cache and there is not enough unused space in the cache to hold the record, the least recently used record or records are discarded to provide sufficient room to hold the new record. A record of data could include one or more clusters of data or another suitable arrangement of data. If map data is clustered in such a way that information regarding a given road segment is often used shortly after the use of information regarding another road segment in the same cluster there will be a significant speed improvement in the pathfinding process because the number of accesses to the CD-ROM will be decreased.

Even with the improvements discussed above, path calculation can be a relatively lengthy process and the users of a pathfinding system generally do not want to wait very long for a path to be calculated.

Furthermore, it is not uncommon for a user to deviate from a planned route or path that was determined by a pathfinding system. The deviation may be made by mistake (e.g. forgetting to make a turn), deliberately (e.g. avoiding a traffic jam) or by necessity (e.g. a turn or way is temporarily forbidden due to construction). When a user of a pathfinding system deviates from a prior computed path, the user is likely to want the pathfinding system to compute a new recommended route from the user's new location to the original destination (called recalculating the path). At such times, the user typically has less patience than usual for a slow pathfinding computation. For example, the initial pathfinding calculation may have been performed while a driver is getting ready to start a trip, but the path re-calculation takes place while the driver is moving, and, possibly, disoriented or stressed.

Therefore, a system is needed that reduces the amount of time needed to re-calculate a path in a network when the user has deviated from a prior computed path.

SUMMARY OF THE INVENTION

The present invention, roughly described, provides for a system for finding a new path from a new origin to a destination in a network using an electronic representation of the network after a deviation from an original path to the destination. The original path includes original nodes and original links. The systems augments the electronic representation of the network by adding new links that directly connect a subset of the original nodes to the destination. After augmenting the electronic representation of the network, the system determines the new path from the new origin to the destination using the augmented electronic representation of the network. The new path is reported to the user of the system. In one embodiment, the system edits the new path to only include travel along links that were in the original network.

The system can be implemented using software and/or hardware. For example, the system can include software stored on a processor readable storage medium. One implementation of the system includes one or more processor readable storage media for storing the electronic representation of the network, a processor and a display. The processor is programmed to augment the network and determine the new path.

These and other objects and advantages of the invention will appear more clearly from the following detailed description in which the preferred embodiment of the invention has been set forth in conjunction with the drawings.

DETAILED DESCRIPTION

The system for recalculating a path may be implemented in hardware and/or software. In one implementation, the system for recalculating a path may comprise a dedicated processor including processor instructions for performing the functions described herein. Circuits may also be developed to perform the functions described herein. In one embodiment, the system for recalculating a path is part of a pathfinding system. The pathfinding system can be a general purpose computer with pathfinding (or recalculation) software or a navigation system. Examples of navigation systems are described in U.S. Pat. No. 4,796,191, Vehicle Navigation System and Method; U.S. Pat. No. 4,914,605, Map Display Apparatus and Method; U.S. Pat. No. 5,311,195, Combined Relative and Absolute Positioning Method and Apparatus; and U.S. patent application Ser. No. 08/747,161, Navigation System Using GPS Data, all of which are incorporated herein by reference. In another implementation, the system for recalculating a path includes a plurality of computer executable instructions for implementation on a general purpose computer system. Prior to loading into a general purpose computer system, the software may reside as encoded information on a computer readable medium, such as a magnetic floppy disk, magnetic tape, and compact disc read only memory (CD-ROM).

Figure 1:
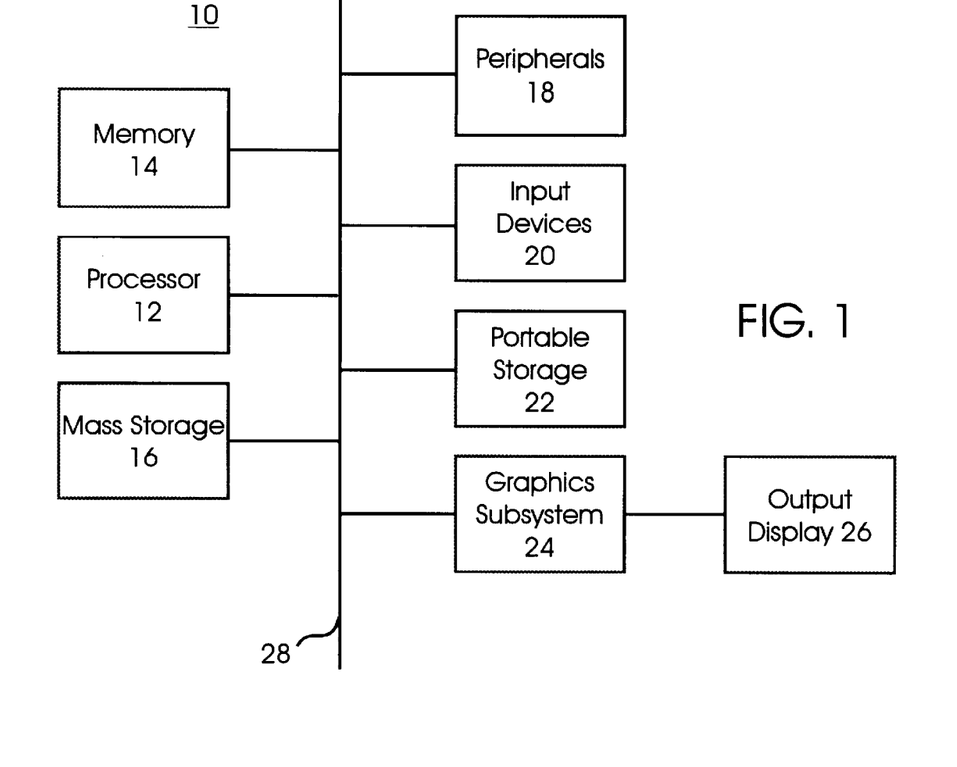
FIG. 1 is a block diagram of one exemplar hardware architecture that can be used to practice the present invention.

FIG. 1 illustrates a high level block diagram of a general purpose computer system in which the system for recalculating a path of the present invention may be implemented. A computer system 10 contains a processor unit 12 and main memory 14. Processor unit 12 may contain a single microprocessor, or may contain a plurality of microprocessors for configuring the computer system 10 as a multi-processor system. Main memory 14 stores, in part, instructions and data for execution by processor unit 12. If the system for recalculating a path of the present invention is wholly or partially implemented in software, main memory 12 stores the executable code when in operation. Main memory 12 may include banks of dynamic random access memory (DRAM) as well as high speed cache memory.

Computer system 10 further includes a mass storage device 16, peripheral device(s) 18, input device(s) 20, portable storage medium drive(s) 22, a graphics subsystem 24 and an output display 26. For purposes of simplicity, the components in computer system 10 are shown in FIG. 1 as being connected via a single bus 28. However, computer system 10 may be connected through one or more data transport means. For example, processor unit 12 and main memory 14 may be connected via a local microprocessor bus, and the mass storage device 16, peripheral device(s) 18, portable storage medium drive(s) 22, graphics subsystem 24 may be connected via one or more input/output (I/O) buses. Mass storage device 16, which may be implemented with a magnetic disk drive or an optical disk drive, is a non-volatile storage device for storing data and instructions for use by processor unit 12. In one embodiment, mass storage device 16 stores the system software for recalculating a path for purposes of loading to main memory 14.

Portable storage medium drive 22 operates in conjunction with a portable non-volatile storage medium, such as a floppy disk, to input and output data and code to and from the computer system 10. In one embodiment, the system software for recalculating a path is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device (s) 10 may include a network interface card for interfacing computer system 10 to a network, a modem, etc.

Input device(s) 20 provide a portion of the user interface for a user of computer system 10. Input device(s) 20 may include an alpha-numeric keypad for inputting alpha-numeric and other key information, or a cursor control device, such as a mouse, a trackball, stylus, or cursor direction keys. In order to display textual and graphical information, computer system 10 contains graphics subsystem 24 and the output display 26. Output display 26 may include a cathode ray tube (CRT) display, liquid crystal display (LCD) or other suitable display device. Graphics subsystem 24 receives textual and graphical information, and processes the information for output to output display 26. Output display 26 can be used to report the results a path recalculation. The components contained in computer system 10 are those typically found in general purpose computer systems, and are intended to represent a broad category of such computer components that are well known in the art. The system of FIG. 1 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

The present invention is directed to a system for recalculating a path in a network. One example of a network suitable for use with the present invention is an electronic map of roads. For example purposes only, the present invention will be discussed with reference to an electronic map. However, the principles of the current invention apply to other networks.

An electronic map of roads is stored in one or more computer files which include the data necessary to construct a map. This data could include longitude and latitude data, addresses, distances, road information, turning restrictions, driving times, highway exit numbers, descriptions of commercial uses of properties, etc. Although the above listed information can be found in an electronic map, it is possible to create an electronic map with only a subset of the above listed information or with other information. The computer files representing an electronic map are stored on a processor readable storage medium.

Generally, an electronic map (or other network) to be used for pathfinding can be represented as a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a directed graph, edges are referred to as links. A weighted graph is a graph in which each link (or edge) has a cost associated with it. Alternatives includes associating the costs with the nodes, with the nodes and links, or associating costs with another element of the graph. An undirected graph is a graph where each link is bidirectional. An undirected graph can be thought of as a directed graph where each link represents two links with the same end points but different directions.

Figure 2A:
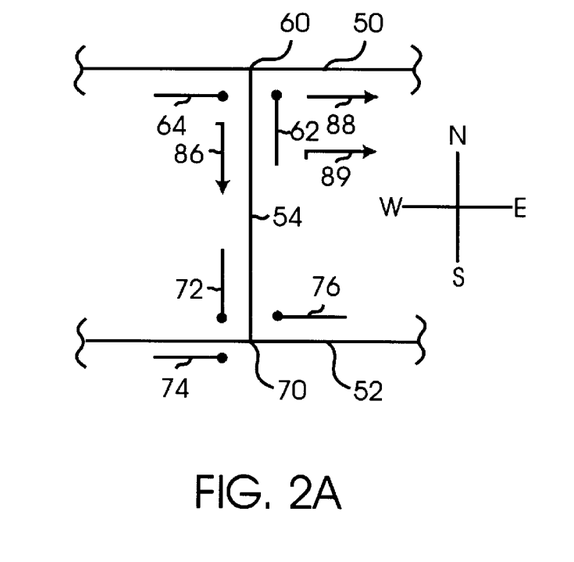
FIG. 2A is an example of a directed graph representing a part of an electronic map.

FIG. 2A shows an exemplar directed graph which shows eastbound one-way street 50 and two-way street 52, both intersecting with two-way street 54. Street 50 intersects with street 54 at intersection 60. Street 52 intersects with street 54 at intersection 70. At intersection 60 are two nodes, 62 and 64. The head of the node is a circle. The rear of the node is a straight-line tail. The circle represents where the node is located and the tail represents where a traveler would come from to reach that node. The node symbol is displaced from the actual intersection for purposes of visibility. For example, node 62 represents travel northbound on street 54 toward intersection 60. Node 64 represents travel eastbound on road 50 toward intersection 60. There is no node at intersection 60 to represent westbound travel on street 50 because street 50 is an eastbound one-way street. Thus, a traveler proceeding north on road 54 and reaching intersection 60 can only make a right turn. Node 72 represents arriving at intersection 70 by traveling south on street 54. Node 74 represents arriving at intersection 70 by traveling east on road 52. Node 76 represents arriving at intersection 70 by traveling west on road 52.

Links represent a path between nodes. For example, from node 64 a traveler can make a right turn at intersection 60 to enter road 54 or can proceed straight on road 50. Link 86 represents travel starting on road 50 facing east, making a right turn at intersection 60 and proceeding south on road 54. Thus, link 86 connects node 64 to node 72. Link 88 connects node 64 to the next node on street 50 (not shown on FIG. 2A) and represents travel east along road 50, proceeding straight through intersection 60 without turning. Link 89 represents travel starting from road 54 facing north, making a right turn at intersection 60 and proceeding east on road 50; therefore, link 89 connects node 62 to the next node on street 50 (not shown on FIG. 2A). FIG. 2A only shows links drawn for nodes 62 and 64. If links are drawn for all nodes, the directed graph would become too crowded and would be difficult to read. Thus, the directed graph is simplified and redrawn as in FIG. 2B.

Figure 2B:
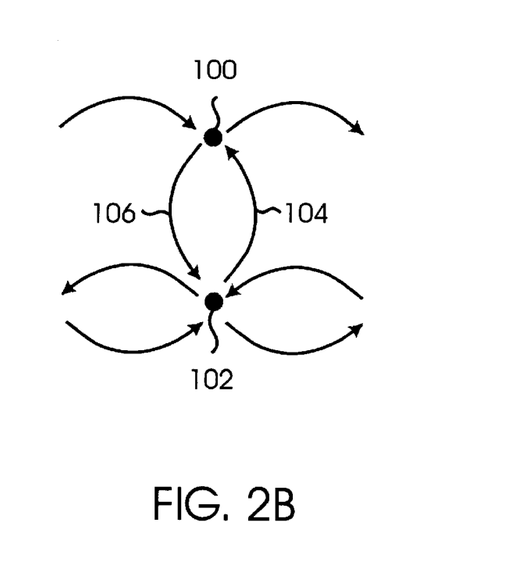
FIG. 2B is a second example of a directed graph representing a part of a network.

In FIG. 2B, all the nodes at the same intersection are collapsed into one node to make the following explanation simpler. (In actual use, the present invention can make use of a graph similar to FIG. 2A or FIG. 2B.) Thus, node 100 represents nodes 64 and 62. Node 102 represents nodes 72, 74 and 76. Note that the tails of the nodes are not drawn. The links are used to indicate directions of allowable travel. Link 104 indicates travel from intersection 70 to intersection 60 and link 106 indicates travel from intersection 60 to intersection 70. Turn restrictions and one-way streets are represented by the presence or absence of a link.

The directed graph of FIG. 2B is used to symbolically understand the data structure stored in a processor readable storage medium. A processor readable storage medium does not actually store an image of a directed graph. Rather, a data structure is stored. In one embodiment, each entry in the data structure represents a node. For each node, the data structure stores the location of the node (e.g., latitude and longitude), a list of neighboring nodes (nodes which can be traveled to via one link) and the various costs associated with getting to the neighboring nodes. It is contemplated that the present invention will work with many suitable data structures different from the one described. Furthermore, the invention need not be used with a directed graph. The present invention can be used with the entire map database, other networks, or any other suitable subset of information. Furthermore, one or more entries in a data structure can be grouped together in a cluster of data. Although clusters can improve performance, the present invention can be used without clusters.

Figure 3:
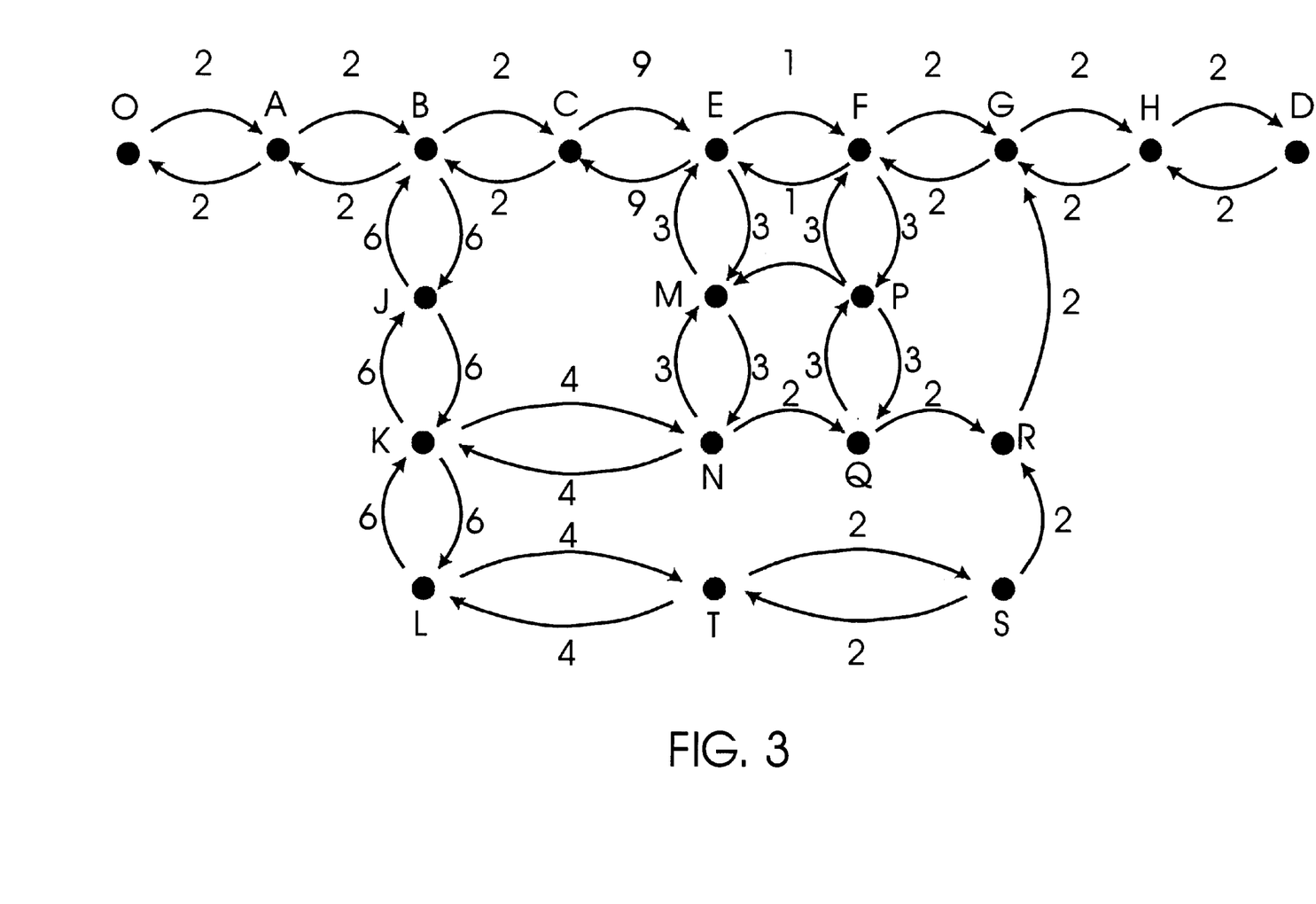
FIG. 3 is a directed graph of a network used for example purposes to help explain the current invention.

One implementation of the present invention can be used with a pathfinding system that includes means for determining a path in a network. When the user of the pathfinding system leaves the planned route, the present invention can be used to recalculate a new route from the user's present location to the original identified destination. For example, FIG. 3 shows a directed graph representing a network. Assume for purposes of example, that FIG. 3 depicts an electronic map of roads to be used by a driver with a pathfinding/navigation system on board the driver's automobile. Assume that the pathfinding system has previously determined a path from an origin O (e.g. the driver's home) to a destination D (e.g. shopping center). The previously computed path was reported as OABCEFGHD, which represents travel from node O to node A, node A to node B, node B to node C, node C to node E, node E to node F, node F to node G, node G to node H, and node H to node D. FIG. 3 shows each of the nodes with links between the nodes. Next to each link is a number representing the cost of traversing that link. As discussed above, the cost can represent time, distance, etc. For example, the cost of traveling from node O to node A is 2. The cost of traveling along the path OABCEFGHD is 22.

Suppose that while the driver of the automobile was traveling along the path OABCEFGHD, the driver deviated from the path by turning right when arriving at node B and, thus, traveling from node B to node J rather than traveling from node B to node C. The driver may have done this by mistake, the driver may have done this intentionally because the driver heard on the radio that there was a traffic jam near node C or construction may have closed the link (e.g. road) between node B and node C forcing the driver to make a right turn when arriving at node B. The driver may then continue until reaching node K. Upon arrival at node K, the driver realizes that he or she is lost and needs the system to determine how that driver should proceed to the destination D from node K. At that point, the present invention is used to quickly recalculate the path to the destination.

Figures 4, 5:
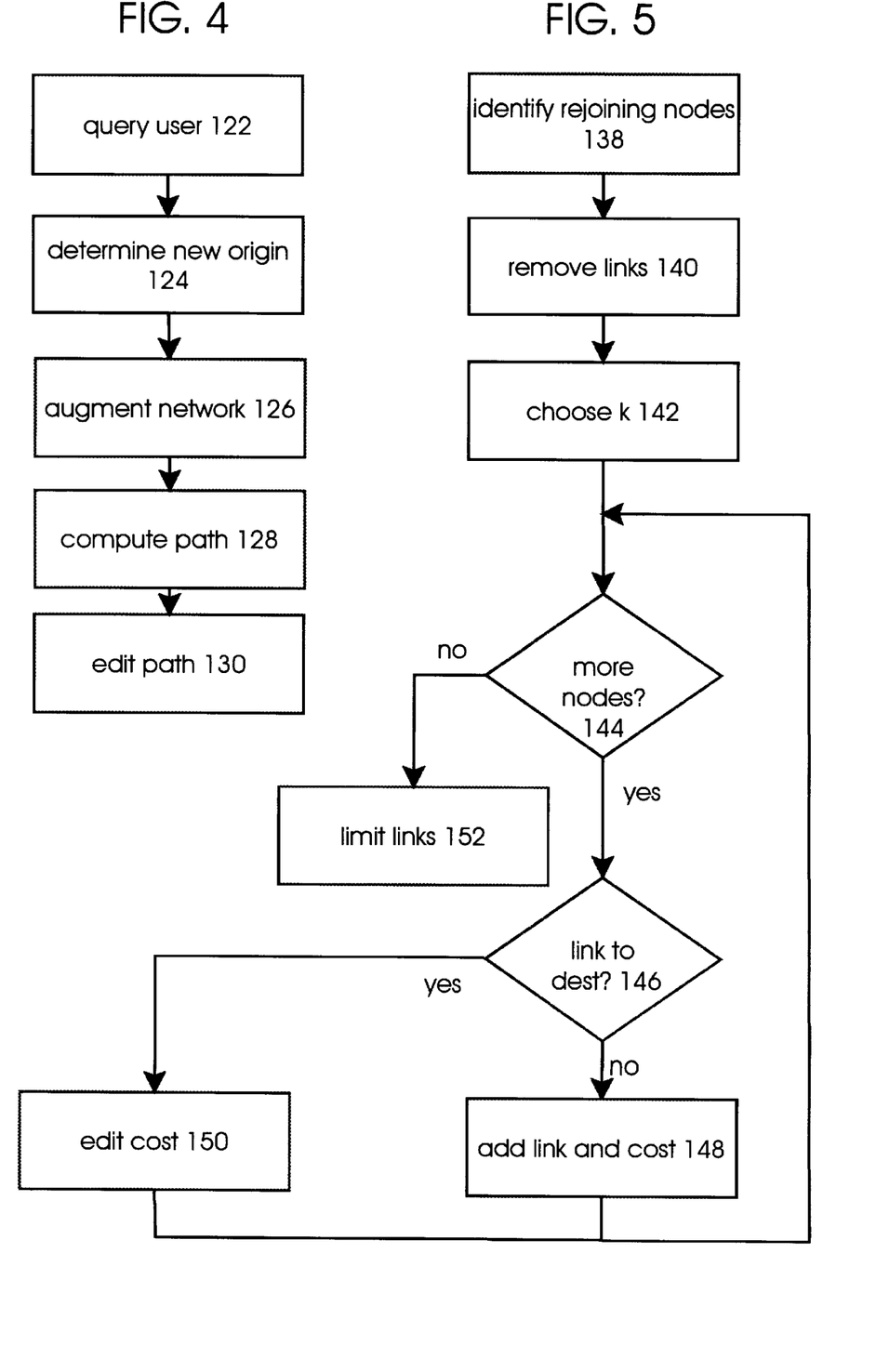
FIG. 4 is a flow chart describing the method of recalculating a path.
FIG. 5 is a flow chart describing the step of augmenting a network.

FIG. 4 is a flow chart describing the method for recalculating a path. The first step shown in FIG. 4 is to query the user/driver 122. This step, which is optional, can be performed during the path recalculation process, at the time the system is turned on or during a time set up or configuration process. In one implementation, step 122 includes the user indicating to the system that the user has deviated from the path. Alternatively, that determination can be made automatically by a navigation system. Step 122 also includes determining setup parameters.

In order for the system to calculate a new path, the system must know where the new path begins. Thus, in step 124, a new origin is determined. In the example of FIG. 3, the driver requested a new path while the driver was at node K. Thus, the system may determine that the new origin is node K. In other embodiments, the user can instruct the system as to what the new origin should be or the system can determine the new origin to be some estimated distance away from the user's current position so that the user will be at the estimated new origin when the method for recalculating a path is completed. After the new origin is determined, the system uses the information stored about the previously computed path to temporarily augment the network in step 126. Using the augmented network, the system computes a path from the new origin to the originally identified destination (step 128). In one embodiment, after the path is determined the system will edit the newly calculated path in step 130 so that the path only includes travel along links that were part of the network prior to step 126.

FIG. 5 further describes the step of augmenting the network 126. The first step in augmenting the network is to identify the rejoining nodes. The rejoining nodes are those nodes that are part of the original path that were not visited prior to the user's deviation from the original path. In the example above, the nodes on the path under consideration are nodes O, A, B, C, E, F, G, H and D. The user visited nodes O, A and B prior to the deviation. The user did not visit nodes C, E, F, G, H or D. Therefore, the rejoining nodes are nodes C, E, F, G, H and D.

In step 140 of FIG. 5, one or more links can be removed from the network. This step is optional. In some implementations, it is desirable to forbid the newly calculated route to include the link that the user originally failed to traverse. In the example above the user failed to traverse the link from B to C. If this link is undesirable (e.g. because of a traffic jam or construction) it would be a bad idea for the system to direct the driver back to the same problem. Thus, in one embodiment the link that the user failed to traverse (in this case B to C) would be removed from the augmented network. In another embodiment, the system determines the next node after the deviation. That node in the above example is node C. The system would then remove all links to node C. In another embodiment, the system queries the user in (e.g. step 122) whether to avoid the links (e.g. roads) into the node after the deviation (e.g. node C). For purposes of the example discussed throughout this description, the system in step 140 will remove the link the user failed to traverse (e.g. B to C). In one implementation of the present invention the step of removing the link could include actually removing the information about the link from the database, adding information to the database signaling that the link should be ignored, adding similar information to an additional file or other suitable method.

Figure 7:
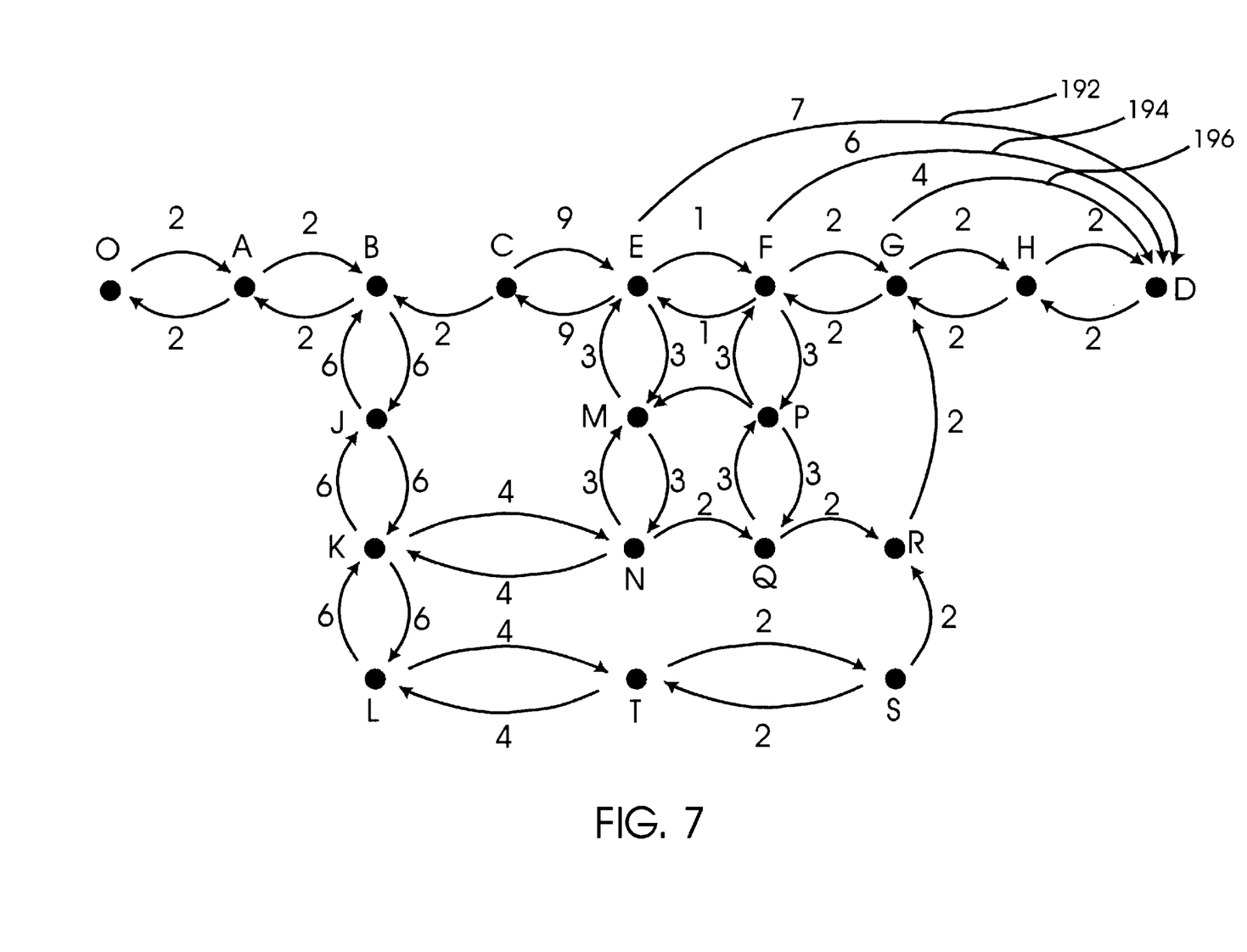
FIG. 7 is a directed graph showing the network of FIG. 3 after the network has been augmented.

FIG. 7 shows the augmented network corresponding to the network in FIG. 3 after the steps of FIG. 5 have been performed. That is if the input to step 126 of FIG. 4 is the network of FIG. 3, the output of step 126 is the augmented network of FIG. 7. Since in step 140, the system removed the link for traversing from node B to node C, the augmented network of FIG. 7 does not include the link from node B to node C.

In step 142 the system chooses a value for the constant k, which is used to bias the path recalculation toward the original path more or less strongly. The constant k is chosen such that k is greater than or equal to 0 and less than or equal to 1. The costs of the added links are then computed by multiplying the cost by the constant k.

When k=1, the costs of the added links are exactly the same as the cost of travel in the unaugmented road network. In this case, the added links just provide "express" connections from the points in the original path to the original destination. These express connections allow the pathfinding calculation to find a path much more quickly than in the unaugmented network, but with little or no preference for the original route.

When k=0, the path computation tries to find the lowest cost route back to a rejoining node on the original path, since the cost from such a node to the destination is treated as 0. In some applications, this may be desirable. The designer of the system may believe that the driver will feel most comfortable when directed back to the originally displayed path as expeditiously as possible. Moreover, because usually very little calculation is required to find a path back to the previous route from a point very near it, the path computation is performed relatively quickly. Intermediate values of k (0<k<1) produce intermediate behavior.

In general, the smaller k is, the sooner the newly calculated route will rejoin the old one, and the faster the calculation will be. The larger k is, the more the newly calculated route will resemble the result of a pathfinding calculation on the unmodified road network, but the longer the calculation will take. Note that if any value of k other than 1 is used, a path calculation will no longer really compute the lowest cost route to the destination. Instead, the path calculation will make some compromise between minimizing cost and getting back to the previously calculated route as quickly as possible.

In one embodiment, k is selected during the manufacturing of the system. In other embodiments, k is selected during power up of the system by the user, at the time of the path recalculation, or during a set up/configuration phase of the system. In some applications, it is useful to allow the value of k to be under the control of the user. Typically, this will be with a setting (e.g. in step 122 of FIG. 4) for selecting between (1) better path quality and slower path recalculation (larger values of k) or (2) poorer path quality and faster path recalculation (smaller values of k). Alternatively, the setting may be described as selecting between a strong preference for the original path (smaller values of k) or a weaker preference of the original path (larger values of k). In other application, it may be desirable for the value of k to be adjusted automatically by the system. For example, the system may increase the value of k when recent experience indicates that slower path recalculation can be tolerated (for example, because recent recalculations have taken less than some specified time limit) and decrease the value of k when recent path recalculation has taken too long.

In step 144 the system looks at whether there are any more rejoining nodes that haven't been considered. At the first iteration of this loop, none of the nodes have been considered; therefore, all the rejoining nodes are still remaining. Of the remaining rejoining nodes, the system chooses the nodes in the order that they will be traveled to during the originally calculated path. Thus, the first instance of performing step 146, the system would consider node C in the above example. In step 146, the system determines whether there is any link directly connecting the particular rejoining node under consideration to the destination. Looking at FIG. 3, the system would determine that there is no link from node C directly to node D. Thus, in step 148, the system adds a link to the augmented network from C to D and determines a cost for that link. The cost corresponding to the new link is equal to k multiplied by the cost of traveling from node C to the destination along the originally calculated path CEFGHD. The cost of traveling CEFGHD is equal to 9 +1+2+2+2=16. Assuming that k=1, the cost of the new link is 16.

After adding the new link from node C to node D the system loops back to step 144 and determines whether there are any more rejoining nodes to consider. In the present example, the system has five more rejoining nodes. In step 146, the system determines that rejoining node E does not include a link directly to destination D, therefore, a new link is added from node E directly to destination D with a cost of 7(k=1 multiplied by 1+2+2+2). Looking at FIG. 7, the new link connecting node E to destination D, having a cost of 7, is depicted by reference numeral 192.

After adding the new link 192 with its corresponding cost to the augmented network, the system loops back to step 144 and determines whether there are any more rejoining nodes to consider. In the present example, the system has four more rejoining nodes to consider. In step 146, the system determines that rejoining node F does not include a link directly to destination D, therefore a new link is added from F directly to D with a cost of 6. FIG. 4 shows the link 194 connecting node F directly to node D with a corresponding cost of 6. The method of FIG. 5 will also add a link 196, having a corresponding cost of 4, connecting node G directly to destination D.

After adding link 196, the system (in step 144) determines that node H has not been considered yet. In step 146, the system determines that there is a link from node H directly to destination D. Therefore the system performs step 150 which includes editing the cost of the link from node H directly to node D. The original link had a cost of 2. That cost is edited by multiplying that cost by the constant k. In the present example, the constant k is equal to 1; therefore, the new edited cost is equal to k×(original cost)=1×2=2. The new cost is added to the augmented network and the system loops back to step 144. Thus, the nodes whose corresponding costs will be edited in step 150 includes nodes have a link directly to the destination and that have not been visited prior to the deviation from the original path.

At this point in the example, the only remaining node is D. Since the cost of traveling from D to itself is zero, multiplying by k will also be zero. The system then loops back to step 144. When the system determines that there are no more rejoining nodes to consider in step 144, the system performs step 152 which is the process of limiting the links added to the augmented network.

The process of limiting the links in the augmented network of step 152 is optional and need not be performed for the current invention to be useful. However, in some implementations, adding very many links to the network may unreasonably slow down the process of computing the new path (step 128). Thus, it may be useful to minimize or limit the number of links added by the present invention. One method for limiting the number of links is to only allow links to be added from those nodes that are within some distance $d_{max}$ of the new origin. The value of $d_{max}$ is determined experimentally such that speed and quality of result is satisfactory.

Figure 6:
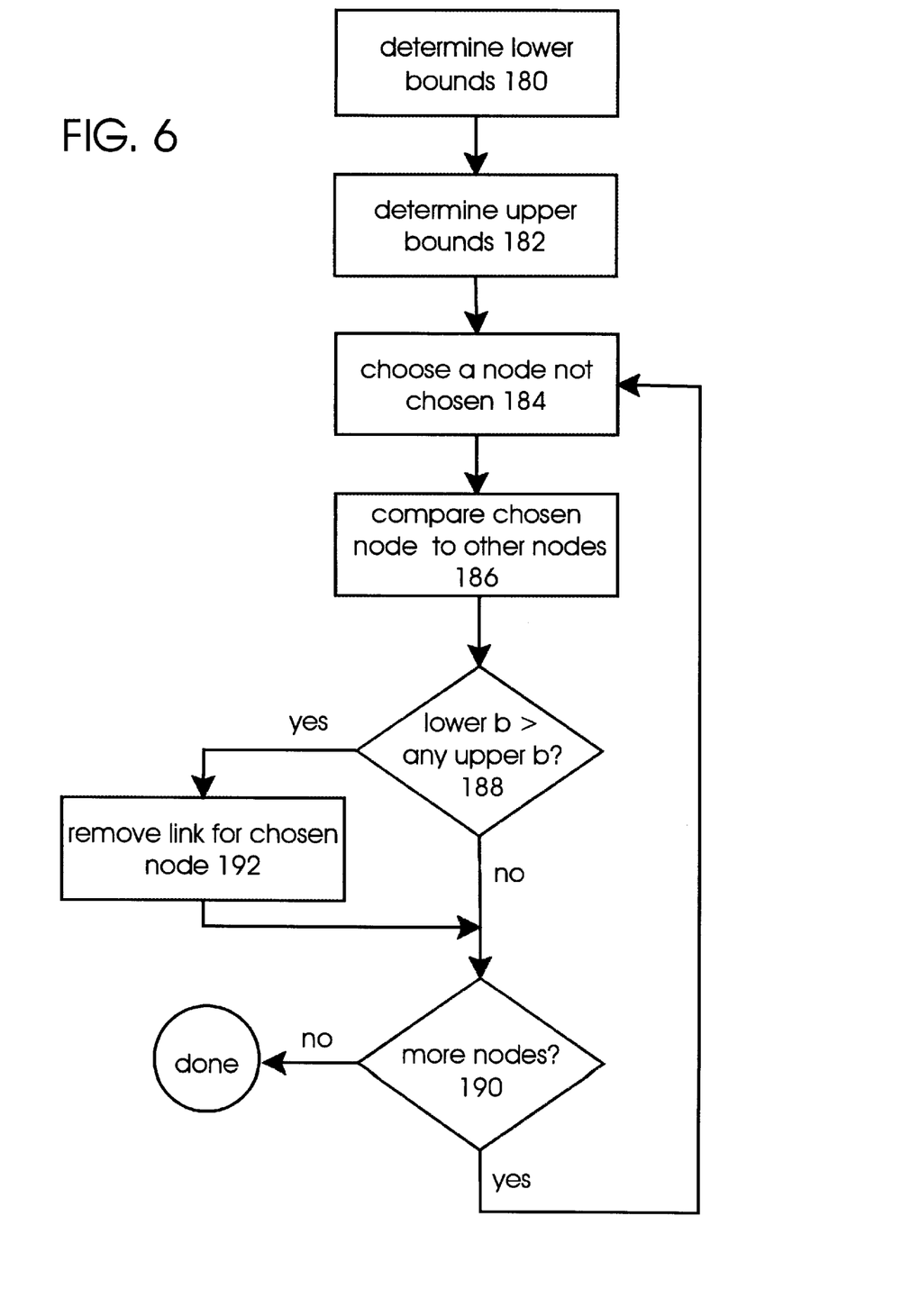
FIG. 6 is a flow chart describing one embodiment for limiting the number of new links added to a network.

FIG. 6 is a flow chart depicting a second method for limiting the links (step 152). The first step is to determine a lower bound for each of the rejoining nodes (step 180). The lower bounds for a node $N_i$, is:

$$I_{min} \times d(O',N_i) + k \times C_i,$$

where $d(O',N_i)$ is the direct distance ("as the crow flies") from O' (the new origin, e.g. node K) to node $N_i$, and $C_i$ is the cost of traveling along the original path from $N_i$ to the destination.

Prior to determining the lower bounds, constants $I_{min}$ and $I_{max}$, which are considered minimum and maximum impedances, are obtained such that it is reasonable to expect that the COST (P, Q)—the cost of the best path from a point P to a point Q—satisfies the inequality $I_{min} \times d(P, Q) \leq COST (P, Q) \leq I_{max} \times d (P, Q)$, where d (P, Q) denotes the direct distance "as the crow flies" from P to Q.

If the cost being minimized is an estimate of driving time, a good value for $I_{min}$ is the inverse of the highest speed limit, since it should not be legally possible to get from P to Q faster than by taking a straight road at the greatest legal speed limit. Similarly, if the cost being minimized is driving distance, then $I_{min}$ in should be 1 since it is impossible to get from P to Q by traveling a distance less than a distance between them. The constant $I_{min}$ converts the cost to units of distance.

$I_{max}$ is derived by experience. If experience shows that most of the time the cost to find a path between two points A, B is $\leq J \times d(A,B)$, then J is a suitable value for $I_{max}$.

These minimum maximum impedances would typically be computed or estimated as constants when the system is being designed, but it is possible for the system itself to derive them at run time.

In step 182, the system determines the upper bounds for each of the rejoining nodes. For a specific rejoining node $N_j$, the upper bounds is computed as:

$$I_{max} \times d(O',N_j) + k \times C_j$$

where $d(O',N_i)$ is the direct distance ("as the crow flies") from O' to $N_i$.

Table 1 shows the computed upper and lower bounds for the rejoining nodes (other than the destination) of the example using FIGS. 3 and 7. For a node $N_i$, the column labeled "distance" represents $d(O',N_i)$(estimated for example purposes) and the column labeled "modified cost" represents the value $k \times C_i$.

TABLE 1

| Node | Distance | Modified Cost | Lower Bound | Upper Bound |
|------|----------|---------------|-------------|-------------|
| C | 6 | 16 | 22 | 28 |
| E | 7 | 7 | 14 | 21 |
| F | 8 | 6 | 14 | 22 |
| G | 10 | 4 | 14 | 24 |
| H | 13 | 2 | 15 | 28 |

In step 184, the system chooses a node in the set of rejoining nodes under consideration (e.g. nodes C, E, F, G and H) that have not been chosen already. The lower bounds for the chosen node is compared to the upper bounds for all of the other nodes in the set being considered. That is, the lower bound for node C is compared to the upper bounds for nodes E, F, G, H. In step 188, it is determined whether this lower bounds is greater than any of the upper bounds. In the present example, the lower bounds for C is 22 and the upper bound for E is 21. If the lower bounds is greater than any of the upper bounds, the system performs step 192 which includes removing the link that was added during step 148 from the chosen node to the destination. In the present example, the link added that connected node C directly to destination D would be removed from the augmented network. The system then determines in step 190 whether there are any more nodes to consider in the set of rejoining nodes. In the present example, the system must still consider nodes E, F, G and H. In step 184 the system chooses node F and compares the lower bound of node F to the upper bounds of node C, F, G, and H. Since the lower bound for node F is not greater than any of the upper bounds, the system does not perform step 192. Steps 184 and 186 are further performed for nodes G and H. Finally in step 190, when the system determines that all the nodes have been considered, step 152 is completed. Note that in FIG. 5 the step of limiting the links 152 is performed at the end of the method. In other embodiments, the step of limiting the links may be performed at an earlier time. For example, if step 152 includes limiting the links added to only those nodes that are within distance $d_{max}$ from the new origin, then that step can be performed as part of step 148.

Figure 8:
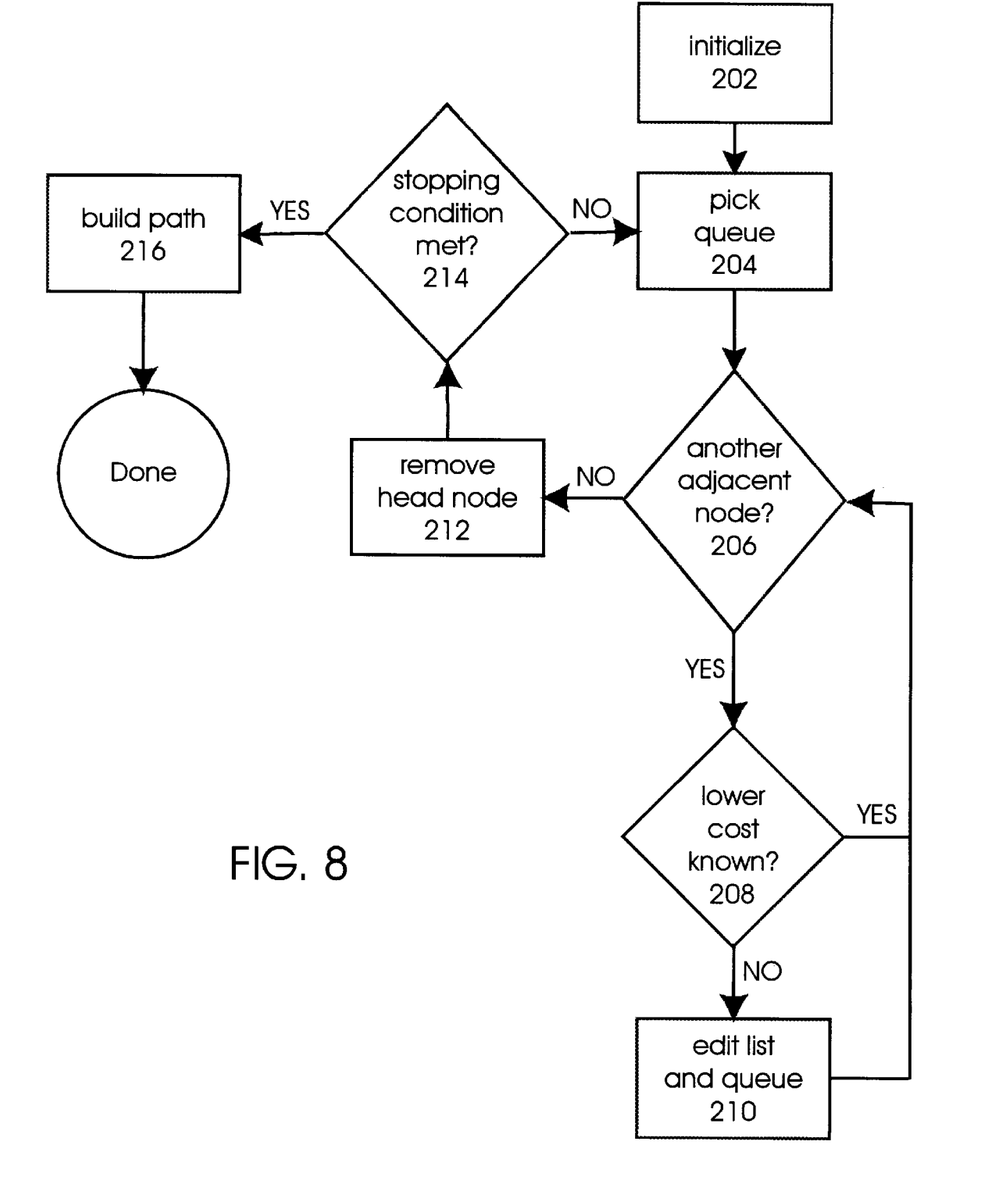
FIG. 8 is a flow chart describing an exemplar method for computing a path.

After step 152 is performed, the augmented network has been created. FIG. 7 shows the augmented network. Referring back to FIG. 4, the system then computes a path in step 128 from the new origin to the destination using the augmented network. FIG. 8 is a flow chart describing the details of computing a path in step 128.

The pathfinding computation of FIG. 8, which is based at least in part on the work of Edsger W. Dijkstra, is only one of many pathfinding methods that can be used with the present invention. One reference that discusses Dijkstra's method is M. N. S. Swamy and K. Thulasiraman, *Graphs, Networks, and Algorithms*, John Wiley & Sons (1981). In step 202, the system initializes the pathfinding computation. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the known shortest distance from the origin to the node plus an estimated cost of traveling from the node to the destination. There are various alternatives for estimating the cost for traveling from the node to the destination which are suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determining a destination key. One alternative includes using the known lowest cost path from the node to the destination. An alternative key includes using the sum of the known cost from the node to the destination plus an estimated cost from the origin to the node. The key described above for the origin priority queue which utilizes the estimated remaining costs produces an exploration from the origin that is biased in the direction of the destination. Similarly, an exploration from the destination is biased in the direction of the origin. Other suitable methods of computing a key are within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the known lowest cost for traveling from the node to the destination, and the identity of the next node along the path to the destination with that lowest cost. After the initialization step 202 is completed, the origin priority queue and the origin visited list include the origin, and the destination priority queue and the destination visited list include the destination.

Once the system is initialized, the system chooses a queue according to a rule in step 204. There are many rules of picking a queue which are suitable for the present invention. In one system, the queue containing the element with the smallest key is chosen, with ties broken arbitrarily. In another system, the queue containing the lesser number of elements is chosen. Other examples of rules for choosing a queue include alternating between queues; choosing the origin queue for a certain number of iterations (or a time period), switching to the destination queue for a certain number of iterations, switching back to the origin queue for a certain number of iterations, etc. Since the queues are sorted by keys, the node with the smallest key will be at the head of the queue (also called the front or the top of the queue). This node is called the "head node." In the example discussed below, the method for picking a queue will be to alternate starting with the origin priority queue.

In step 206 the system looks for all nodes which are adjacent nodes to the head node of the chosen queue. Since the system has just started, the only node in the origin priority queue is the origin. The adjacent nodes are those nodes which can be traveled to from the head node without going through any other nodes. The adjacent nodes for the new origin K are nodes J, N and L. Since there are three adjacent nodes, the system arbitrarily picks one adjacent node. In step 208 the system determines whether there is a lower cost known on the visited list or the priority queue for the adjacent node picked. That is, the system determines the cost of traveling from the head node to the adjacent node and adds that cost to the cost already known for the head node. In this case, the adjacent node picked is node J, the cost of traveling from the origin to node J is 6. Since the pathfinding computation has just started, node J is not on the visited list or the origin priority queue so there is no known cost. Since there is no known cost, in step 210 the system edits the visited list and the priority queue to add node J and its cost. The method loops back to step 206 to determine whether any additional adjacent nodes have not been considered. In this case there are two adjacent nodes that have not been considered: N and L.

In step 208, the system determines whether there is a lower cost known for node L. The cost for traveling from origin K to node L is 6 and node L does not appear on the priority queue or the visited list. In step 210, node L is added to the priority queue and the visited list. The system loops back to step 206 and considers node N. Since there is no known cost lower than the cost of traversing directly from origin K to node N, which is 4, node N is added to the priority queue and the visited list. The system loops back to step 206 and determines that there are no adjacent nodes; therefore, in step 212 the head node, which is currently the origin, is removed from the priority queue. Table 1 reflects the contents of the origin priority queue and the visited list at this point in the pathfinding computation. There are three nodes on the origin priority queue: J, N and L. Their keys represent the cost of traveling from the origin to that node. The visited list has three columns: Node, Cost and Prev. The node column lists the node identification, the cost column lists the lowest known cost of traveling from the origin to that node and the Prev column lists the previous node along the path from the origin to the listed node when traveling along the path utilizing the lowest known cost. The order that the nodes are listed in the visited list can be any order that makes it easy to search the list. For example, the nodes can be listed in alphabetical order. In one implementation, the nodes are named by numerical codes and the visited list is a hash table.

TABLE 2

| Origin Priority Queue | | Origin Visited List | | |
|---|---|---|---|---|
| Node | Key | Node | Cost | Prev |
| N | 4 | J | 6 | K |
| J | 6 | K | 0 | — |
| L | 6 | L | 6 | K |
| | | N | 4 | K |

In step 214 the system determines whether a stopping condition has occurred. There are many stopping conditions which are suitable for the present invention, for example, stopping when a node has been the head node on both the origin priority queue and the destination priority queue. Another stopping condition, which is the stopping condition used in this example, is stopping when the cost of traveling from the origin to the head node in the origin priority queue plus the cost of traveling from the head node of the destination priority queue to the destination is greater than or equal to the total cost of the best connection node. A connection node is the node that appears on the destination visited list and the origin visited list. Total cost of a connection node is the cost from the origin to the connection node plus the cost from the connection node to the destination. The best connection node is the connection node with the lowest total cost. In the present case there is no connection nodes so the stopping condition fails and, in step 204, the system picks a queue.

As discussed above, the queue selection algorithm in the present example is alternating; therefore, the system picks the destination queue. In step 206 the system determines whether there are any nodes adjacent to the destination D. In the augmented network of FIG. 7, there are four adjacent nodes E, F, G and H. In step 208, the system looks at node E and determines whether there is a lower known cost. Since there is not, in step 210 the destination priority queue and visited list are edited to add node E and its cost of 7. The method loops back to step 206 which determines that there is another adjacent node, node F. In step 208, the system determines that there is not a lower cost known for F. In step 210, the destination priority queue and the destination visited list are edited to add node F and its costs of 6. The method loops back to step 206 which determines that there is another adjacent node, node G. In step 208, the system determines that there is not a lower cost known for G. In step

210, the destination priority queue and the destination visited list are edited to add node G and its cost of 4. The method loops back to step 206 which determines that there is another adjacent node, node H. In step 208, the system determines that there is not a lower cost known for H. In step 210, the destination priority queue and the destination visited list are edited to add node H and its cost of 2. In step 206, the system determines there are no more adjacent nodes and node D is removed from the destination priority queue in step 212. Table 3 reflects the state of the destination priority queue and visited list at this point in the method. The column labeled Next list the next node along the path from the listed node to the destination when traveling along the path utilizing the lowest cost known.

TABLE 3

| Dest. Priority Queue | | Dest. Visited List | | |
|---|---|---|---|---|
| Node | Key | Node | Cost | Next |
| H | 2 | D | 0 | — |
| G | 4 | E | 7 | D |
| F | 6 | F | 6 | D |
| E | 7 | G | 4 | D |
| | | H | 2 | D |

Since there are no connection nodes, the stopping condition fails (step 214) and the system picks the origin priority queue (step 204). From Table 2, it can be seen that the head node on the origin priority queue is node N. In step 206, the system determines that there are two adjacent nodes to node N (other than the origin): nodes M and Q. In step 208, the system determines that there is not a lower cost known for node M. In step 210, the origin priority queue and the origin visited list are edited to add node M and its cost of 7. The method loops back to step 206 which determines that there is another adjacent node, node Q. In step 208, the system determines that there is not a lower cost known for node Q. In step 210, the origin priority queue and the origin visited list are edited to add node Q and its cost of 6. In step 206, the system determines there are no more adjacent nodes to node N and node N is removed from the origin priority queue in step 212. Table 4 reflects the current state of the origin priority queue and the visited list after node N was removed from the priority queue (step 212).

TABLE 4

| Origin Priority Queue | | Origin Visited List | | |
|---|---|---|---|---|
| Node | Key | Node | Cost | Prev |
| J | 6 | J | 6 | K |
| L | 6 | K | 0 | — |
| Q | 6 | L | 6 | K |
| M | 7 | M | 7 | N |
| | | N | 4 | K |
| | | Q | 6 | N |

At this point, the stopping condition fails because there is no connection node and the system picks the destination queue (step 204). In step 206, the system looks for nodes adjacent to the head node on the destination queue. Since the head node is node H, the only adjacent node (other than D) is node G. The cost of traveling from G to H is 2, thus, the cost traveling from G to H to D is 4. In step 208, the system determines that there is a cost of traveling from G to D of 4 already known; therefore there is no reason to edit the visited list. In step 206 the system determines that there is not another adjacent node and H is removed from the priority queue in step 212. Table 5 reflects the state of the destination priority queue and visited list at this point in the method.

TABLE 5

| Dest. Priority Queue | | Dest. Visited List | | |
|---|---|---|---|---|
| Node | Key | Node | Cost | Next |
| G | 4 | D | 0 | — |
| F | 6 | E | 7 | D |
| E | 7 | F | 6 | D |
| | | G | 4 | D |
| | | H | 2 | D |

Since there are no connection nodes, the stopping condition fails (step 214) and the system picks the origin priority queue (step 204). From Table 4, it can be seen that the head node on the origin priority queue is node J. In step 206, the system determines that there is one adjacent node (other than the origin): node B. In step 208, the system determines that there is not a lower cost known for node B. In step 210, the origin priority queue and the origin visited list are edited to add node B and its cost of 12. In step 206 the system determines there are no more adjacent nodes and node J is removed from the origin priority queue in step 212. Table 6 reflects the current state of the origin priority queue and the visited list after node J was removed from the priority queue (step 212).

TABLE 6

| Origin Priority Queue | | Origin Visited List | | |
|---|---|---|---|---|
| Node | Key | Node | Cost | Prev |
| L | 6 | B | 12 | J |
| Q | 6 | J | 6 | K |
| M | 7 | K | 0 | — |
| B | 12 | L | 6 | K |
| | | M | 7 | N |
| | | N | 4 | K |
| | | Q | 6 | N |

The stopping condition fails because there is no connection node. The system then picks the destination queue (step 204). In step 206, the system looks for nodes adjacent to the head node on the destination queue. Since the head node is node G, the adjacent nodes (other than H) are F and R. The cost of traveling FGHD is 6. In step 208, the system determines that there is a cost of traveling from F to D of 6 already known; therefore the visited list is not edited. In step 206, the system determines that there is another adjacent node: node R. The cost of traveling RGHD is 6. There is no lower cost known; therefore, R is added to the destination priority queue and visited list. Node G is removed from the priority queue in step 212. Table 7 reflects the state of the destination priority queue and visited list at this point in the method.

TABLE 7

| Dest. Priority Queue | | Dest. Visited List | | |
|---|---|---|---|---|
| Node | Key | Node | Cost | Next |
| F | 6 | D | 0 | — |
| R | 6 | E | 7 |  |

TABLE 7-continued

| Dest. Priority Queue | | Dest. Visited List | | |
|---|---|---|---|---|
| Node | Key | Node | Cost | Next |
| E | 7 | F | 6 | D |
|   |   | G | 4 | D |
|   |   | H | 2 | D |
|   |   | R | 6 | G |

Since there are no connection nodes, the stopping condition fails (step 214) and the system picks the origin priority queue (step 204). From Table 4, it can be seen that the head node on the origin priority queue is node L. In step 206, the system determines that there is one adjacent node (other than the origin): node T. In step 208, the system determines that there is not a lower cost known for node T. In step 210, the origin priority queue and the origin visited list are edited to add node T and its cost of 10. In step 206, the system determines there are no more adjacent nodes and node L is removed from the origin priority queue in step 212. Table 8 reflects the current state of the origin priority queue and the visited list after node L was removed from the priority queue (step 212).

TABLE 8

| Origin Priority Queue | | Origin Visited List | | |
|---|---|---|---|---|
| Node | Key | Node | Cost | Prev |
| Q | 6 | B | 12 | J |
| M | 7 | J | 6 | K |
| T | 10 | K | 0 | — |
| B | 12 | L | 6 | K |
|   |   | M | 7 | N |
|   |   | N | 4 | K |
|   |   | Q | 6 | N |
|   |   | T | 10 | L |

Because there is no connection node the stopping condition fails and the system picks the destination queue (step 204). In step 206, the system determines that there are two adjacent nodes: node E and node P. The cost of traveling from node E to the destination D is 7. In step 208, the system determines that there is a cost of traveling from E to D of 7 already known; therefore the visited list is not edited. In step 206, the system determines that there is another adjacent node: node P. The cost of traveling from node P to the destination D is 9. There is no lower cost known; therefore, P is added to the destination priority queue and visited list. Node F is removed from the priority queue in step 212. Table 9 reflects the state of the destination priority queue and visited list at this point in the method.

TABLE 9

| Dest. Priority Queue | | Dest. Visited List | | |
|---|---|---|---|---|
| Node | Key | Node | Cost | Next |
| R | 6 | D | 0 | — |
| E | 7 | E | 7 | D |
| P | 9 | F | 6 | D |
|   |   | G | 4 | D |
|   |   | H | 2 | D |
|   |   | P | 9 | F |
|   |   | R | 6 | G |

Since there are no connection nodes, the stopping condition fails (step 214) and the system picks the origin priority queue (step 204). From Table 8, it can be seen that the head node on the origin priority queue is node Q. In step 206, the system determines that there are two adjacent nodes: P and R. The system first considers node P. In step 208, the system determines that there is not a lower cost known for node P in the origin visited list. In step 210, the origin priority queue and the origin visited list are edited to add node P and its cost of 9. In step 206, the system determines there is another adjacent node: node R. In step 208, the system determines that there is not a lower cost known for node R in the origin visited list. In step 210, the origin priority queue and the origin visited list are edited to add node R and its cost of 8. In step 206, the system determines that there are no more adjacent nodes and node Q is removed from the origin priority queue in step 212. Table 10 reflects the current state of the origin priority queue and the visited list after node Q was removed from the priority queue (step 212).

TABLE 10

| Origin Priority Queue | | Origin Visited List | | |
|---|---|---|---|---|
| Node | Key | Node | Cost | Prev |
| M | 7 | B | 12 | J |
| R | 8 | J | 6 | K |
| P | 9 | K | 0 | — |
| T | 10 | L | 6 | K |
| B | 12 | M | 7 | N |
|   |   | N | 4 | K |
|   |   | P | 9 | Q |
|   |   | Q | 6 | N |
|   |   | R | 8 | Q |
|   |   | T | 10 | L |

In step 214, the system determines whether the stopping condition has been met. At this point there are two connection nodes. Nodes P and R are on the visited lists for the origin and the destination. The total cost for node P is 18. That is, the cost from traveling from the origin to node P is 9 and from node P to the destination is 9. The total cost for node R is 14. Since node R has the lowest total costs, node R is the best connection node. Various alternatives within the scope of the present invention may utilize other definitions of "best connection node." The cost of traveling from the origin to the head node M on the origin priority queue is 7. The cost of traveling from the head node R of the destination priority queue to the destination is 6. Therefore, the cost of traveling to and from the head nodes is 13, which is less than the total cost of the best cost connection node. Thus, the stopping condition fails, the system loops back to step 204 and the destination queue is considered.

In step 206 the system looks for adjacent nodes to the head node R. The first adjacent node considered is node Q. The cost of traveling from node Q to destination D is 8. There is no lower cost known; therefore, Q is added to the destination priority queue and visited list. In step 206, the system determines that there is another adjacent node: node S. The cost of traveling from node S to the destination D is 8. There is no lower cost known; therefore, S is added to the destination priority queue and visited list. Node R is removed from the priority queue in step 212. Table 11 reflects the state of the destination priority queue and visited list after node R is removed from the priority queue.

TABLE 11

| Dest. Priority Queue | | Dest. Visited List | | |
| --- | --- | --- | --- | --- |
| Node | Key | Node | Cost | Next |
| E | 7 | D | 0 | — |
| Q | 8 | E | 7 | D |
| S | 8 | F | 6 | D |
| P | 9 | G | 4 | D |
| | | H | 2 | D |
| | | P | 9 | F |
| | | Q | 8 | R |
| | | R | 6 | G |
| | | S | 8 | R |

There are three connection nodes: Q, R and P. Nodes Q and R have a total cost of 14 and P has a total cost of 18. Thus, Q and R are considered the best connection nodes. The cost of traveling from the origin to the head node M on the origin priority queue is 7. The cost of traveling from the head node E of the destination priority queue to the destination is 7. Therefore, the cost of traveling to and from the head nodes is 14, which is equal to the total cost of the best cost connection node. Thus, the stopping condition is met and the system builds the path in step 216.

The step of building the path is as follows. A rule selects some connection node. One such rule is to choose the best connection node. The selected connection node Z is looked up in the origin visited list and the previous node $Y_1$ on the path from the origin is found. If $Y_1$ is not the origin, then $Y_1$ is looked up in the visited list and the previous node $Y_2$ is found. This continues until the origin is reached. Suppose the origin is reached as node $Y_v$. Similarly, Z is looked up in the destination visited list and the next node $W_1$ is found. If $W_1$ is not the destination, then $W_1$ is looked up in the visited list. This continues until the destination is reached. Suppose the destination is reached as node $W_x$. At this point the path from the origin to the destination is known: it is the path from $Y_v$ (the origin) to $Y_{v-1}$, to $Y_{v-2}$, . . . , to $Y_2$, to $Y_1$, to Z, to $W_1$, . . . , to $W_x$ (the destination).

In the present example, nodes Q and R were both the best connection nodes. The system arbitrarily picks node Q. Looking at the visited list in Table 10, the best known cost of traveling from the origin K to node Q involves traveling from node N to node Q. Thus, the path being built will travel from N to Q. The system then finds node N in the visited list and determines that the best path to node N is directly from the origin K. At this point the path built includes traveling from K to N to Q. After the system reaches the origin, the system builds a path from the connection node to the destination. Looking at the visited list in Table 11, the best path from Q to the destination involves traveling from Q to R. Thus, R is added to the path. The visited list also indicates that the best path from R to D is involves traveling from node R to node G. Thus, G is added to the path. The visited list also indicates that the best path from G to D is directly from G to D. Thus, the path built from the augmented network is KNQRGD.

Note that in the above example, k=1. If k were reduced to 0.5 the path calculated in step 128 would be KNMED. That is, because k modified the cost, the pathfinding computation was biased to find a quicker route back to the original path.

Looking back at FIG. 4, after the system computes a path in the augmented network the system edits the computed path in step 130. The system inspects the path created by step 128 and attempts to identify any links in that path that were added during step 126 (hereinafter called "added links"). If the system finds any such added links in the newly calculated path, the system determines the two end nodes of the added link. The system looks to the original path created for the user (prior to the user's deviation from that original path) to find the original path between the end nodes of the added link. The added link is then replaced by the original path between the end nodes of the added link so that the new path which is the output of the system for recalculating a path only includes travel along links that were in the network prior to the step of augmenting the network.

For example, the path built in the augmented network in the example above was KNQRGD. That path is possible in the augmented network because a link was added to the augmented network that allowed travel directly from node G to node D. But in the original network, there is no link between G and D. The original path between nodes G and D was GHD. Thus, in the example above, the link from G to D is replaced by two links: a first link from G to H and a second link from H to D. Thus, the path is edited or rewritten as KNQRGHD, which is reported to the user.

The data that comprises the electronic map (or electronic representation of the network) is generally stored in one or more files on a CD-ROM or other suitable media. At run time, some or all of the files can be copied (partially or entirely) to the local memory for the hardware system. When the system augments the network, the system can edit the files or data copied to the local memory, edit the original files or data stored on other media (if possible) or create new files to be stored locally or on other media. Thus, the augmented network is represented by the newly created files (if any), the edited files (if any) and/or the applicable original files.

One means for decreasing the time needed for computing or recomputing a path includes caching data. For example, a portion of memory 14 (FIG. 1) will be dedicated to act as a cache for pathfinding purposes. When the system looks at adjacent nodes in step 206 (FIG. 8), it needs to access data for that node. The system will first look in the cache portion of memory 14. If the node information is found in memory 14, the system reads that information and proceeds to carry out the steps in the method. If the data is not found in the cache portion of memory 18, then the system will access the electronic map database which may be on a CD-ROM. Other processor readable storage media sufficiently local to the processor can also be used to cache data.

In some systems, the pathfinding computation is speeded up by not considering all nodes to which a head node is connected to. Rather, the exploration is limited to certain neighboring nodes. One such method classifies nodes according to the importance of the roads on which they occur, and progressively restricts the use of neighboring nodes as a distance from the origin (or to the destination) increases. For example, if the cost measure being used is an estimate of driving time, the exploration might not use residential-level roads more than two minutes' driving time from the origin or destination, nor use arterial-level roads more than ten minutes' driving time from the origin or destination, and so on.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of finding a new path from a new origin to a destination in a network using an electronic representation of said network after a deviation from an original path to said destination, said original path including original nodes and original links, comprising the steps of:

augmenting said electronic representation of said network by adding new links to said electronic representation of said network, said new links directly connecting a subset of said original nodes to said destination; and determining said new path from said new origin to said destination using said electronic representation of said network with said new links.

2. A method according to claim 1, wherein:

said electronic representation of said network being stored in a first set of one or more processor readable files and said new links stored in a second set of one or more processor readable files.

3. A method according to claim 1, further including the step of:

editing said new path to only include travel along original links.

4. A method according to claim 1, further including the step of:

reporting said new path.

5. A method according to claim 1, further including the step of:

determining said new origin.

6. A method according to claim 5, wherein:

said step of determining said new origin estimates said new origin to be a location where a user will be at a future time.

7. A method according to claim 1, wherein:

said subset of said original nodes being rejoining nodes.

8. A method according to claim 1, wherein:

said step of augmenting includes identifying rejoining nodes, each of said new links being connected from one of said rejoining nodes to said destination.

9. A method according to claim 1, wherein:

each node of said subset of said original nodes does not have a direct link to said destination prior to said step of augmenting.

10. A method according to claim 1, wherein:

each node of said subset of said original nodes does not have a direct link to said destination prior to said step of augmenting and is within a predetermined distance from said new origin.

11. A method according to claim 1, wherein:

said subset being defined to include original nodes having a lower bounds which is less than any upper bounds of original nodes that do not have a link directly to said destination.

12. A method according to claim 1, further including the step of:

receiving operator input, wherein said deviation from said original path occurring after travel to a first node and before travel to a second node and said step of determining said new path does not utilize a link representing a path to said second node in response to said operator input.

13. A method according to claim 1, wherein:

an original node having an original link directly to said destination and not being visited prior to said deviation has a corresponding costs for traversing said original link;

said step of augmenting includes editing said corresponding cost.

14. A method according to claim 1, wherein:

said step of augmenting includes assigning costs to said new links.

15. A method according to claim 14, wherein:

each new link being associated with an original node; and said assigned cost for a particular new link being equal to a constant multiplied by a cost of traveling between said associated original node and said destination along said original path.

16. A method according to claim 15, wherein:

said cost is travel time.

17. A method according to claim 15, wherein:

said cost is distance.

18. A method according to claim 15, wherein:

said constant is equal to one.

19. A method according to claim 15, wherein:

said constant is greater than or equal to zero; and said constant is less than or equal to one.

20. A method according to claim 15, further including the steps of receiving operator input; and determining said constant based on said operator input.

21. A method according to claim 1, wherein:

said step of augmenting includes removing an original link.

22. A method according to claim 21, further including the step of:

receiving operator input, said step of removing an original link being based on said operator input.

23. A method according to claim 1, further including the steps of:

identifying rejoining nodes, each of said new links being connected from one of said rejoining nodes to said destination;

editing said new path to only include travel along original links; and reporting said new path;

wherein said electronic representation of a network is an electronic map, said step of augmenting includes assigning costs to said new links, each new link being associated with an original node, said assigned cost for a particular new link being equal to a constant multiplied by a cost of traveling between said associated original node and said destination along said original path, and said constant is greater than or equal to zero and less than or equal to one.

24. A method according to claim 1, wherein:

said electronic representation of a network is an electronic map.

25. A method according to claim 24, further including the step of:

editing said new path to only include travel along original links.

26. A method according to claim 24, wherein:

said step of augmenting includes assigning costs to said new links.

27. A method according to claim 26, wherein:

each new link being associated with an original node; and said assigned cost for a particular new link being equal to a constant multiplied by a cost of traveling between said associated original node and said destination along said original path.

28. A method of finding a new path from a new origin to a destination in a network using an electronic representation of said network after a deviation from an original path to said destination, said original path including original nodes and original links, comprising the steps of:

augmenting said electronic representation of said network by adding new links to said electronic representation of said network, said new links directly connecting a subset of said original nodes to said destination; and determining said new path from said new origin to said destination using said electronic representation of said network with said new links, said deviation from said original path occurring after travel to a first node and before travel to a second nodes, said step of determining said new path does not utilize a link representing travel from said first node to said second node.

29. A processor readable storage medium having processor readable program code embodied on said processor readable storage medium, said processor readable program code for programming a processor to perform a method for finding a new path from a new origin to a destination in a network using an electronic representation of said network after a deviation from an original path to said destination, said original path including original nodes and original links, said method comprising the steps of:

augmenting said electronic representation of said network by adding new links to said electronic representation of said network, said new links directly connecting a subset of said original nodes to said destination; and determining said new path from said new origin to said destination using said electronic representation of said network with said new links.

30. A processor readable storage medium according to claim 29, wherein, said method further includes the step of:

editing said new path to only include travel along original links.

31. A processor readable storage medium according to claim 29, wherein, said method further includes the step of:

reporting said new path.

32. A processor readable storage medium according to claim 29, wherein, said method further includes the step of:

determining said new origin.

33. A processor readable storage medium according to claim 29, wherein:

each node of said subset of said original nodes does not have a direct link to said destination prior to said step of augmenting.

34. A processor readable storage medium according to claim 29, wherein:

each node of said subset of said original nodes does not have a direct link to said destination prior to said step of augmenting and is within a predetermined distance from said new origin.

35. A processor readable storage medium according to claim 29, wherein:

said subset being defined to include original nodes having a lower bounds which is less than any upper bounds of original nodes that do not have a link directly to said destination.

36. A processor readable storage medium according to claim 29, wherein, said method further includes the step of:

receiving operator input, wherein said deviation from said original path occurring after travel to a first node and before travel to a second node and said step of determining said new path does not utilize a link representing a path to said second node in response to said operator input.

37. A processor readable storage medium according to claim 29, wherein:

said step of augmenting includes assigning costs to said new links.

38. A processor readable storage medium according to claim 37, wherein:

each new link being associated with an original node; and said assigned cost for a particular new link being equal to a constant multiplied by a cost of traveling between said associated original node and said destination along said original path.

39. A processor readable storage medium according to claim 29, wherein:

said electronic representation of a network is an electronic map.

40. A processor readable storage medium according to claim 39, wherein, said method further includes the steps of:

identifying rejoining nodes, each of said new links being connected from one of said rejoining nodes to said destination, editing said new path to only include travel along original links; and reporting said new path;

wherein said step of augmenting includes assigning costs to said new links, each new link being associated with an original node, said assigned cost for a particular new link being equal to a constant multiplied by a cost of traveling between said associated original node and said destination along said original path, and said constant is greater than or equal to zero and less than or equal to one.

41. A processor readable storage medium according to claim 39, wherein, said method further includes the step of:

editing said new path to only include travel along original links.

42. A processor readable storage medium according to claim 39, wherein:

said step of determining includes assigning costs to said new links.

43. A processor readable storage medium according to claim 39, wherein:

each new link being associated with an original node; and said assigned cost for a particular new link being equal to a constant multiplied by a cost of traveling between said associated original node and said destination along said original path.

44. A system for finding a new path from a new origin to a destination in a network using an electronic representation of said network after a deviation from an original path to said destination, said original path including original nodes and original links, comprising:

means for augmenting said electronic representation of said network by adding new links to said electronic representation of said network, said new links directly connecting a subset of said original nodes to said destination; and means for determining said new path from said new origin to said destination using said electronic representation of said network with said new links.

45. A system according to claim 44, further including:

means for reporting said new path, said electronic representation of said network being an electronic map.

46. A system for finding a new path from a new origin to a destination in a network using an electronic representation of said network after a deviation from an original path to said destination, said original path including original nodes and original links, comprising:

one or more processor readable storage mediums for storing said electronic representation of said network; and     a processor, in communication with said one or more processor readable mediums, said processor programmed to:

augment said electronic representation of said network by adding new links to said electronic representation of said network, said new links directly connecting a subset of said original nodes to said destination, and         determine said new path from said new origin to said destination using said electronic representation of said network with said new links.

47. A system according to claim 46, wherein:

said electronic representation of said network is an electronic map.

48. A system according to claim 47, further including:

a display, in communication with said processor, for reporting said new path.

49. A system according to claim 47, wherein:

said processor further programmed to edit said new path to only include travel along original links.

50. A system according to claim 47, wherein:

each node of said subset of said original nodes does not have a direct link to said destination prior to adding said new links.

51. A system according to claim 47, wherein:

said deviation from said original path occurring after travel to a first node and before travel to a second node; and said new path does not include a link representing travel from said first node to said second node.

52. A system according to claim 47, wherein:

said processor further programmed to assign costs to said new links.

\* \* \* \* \*